No. 675,847. Patented June 4, 1901.
A. BENSON.
MOTOR.
(Application filed Dec. 26, 1899.)
(No Model.)
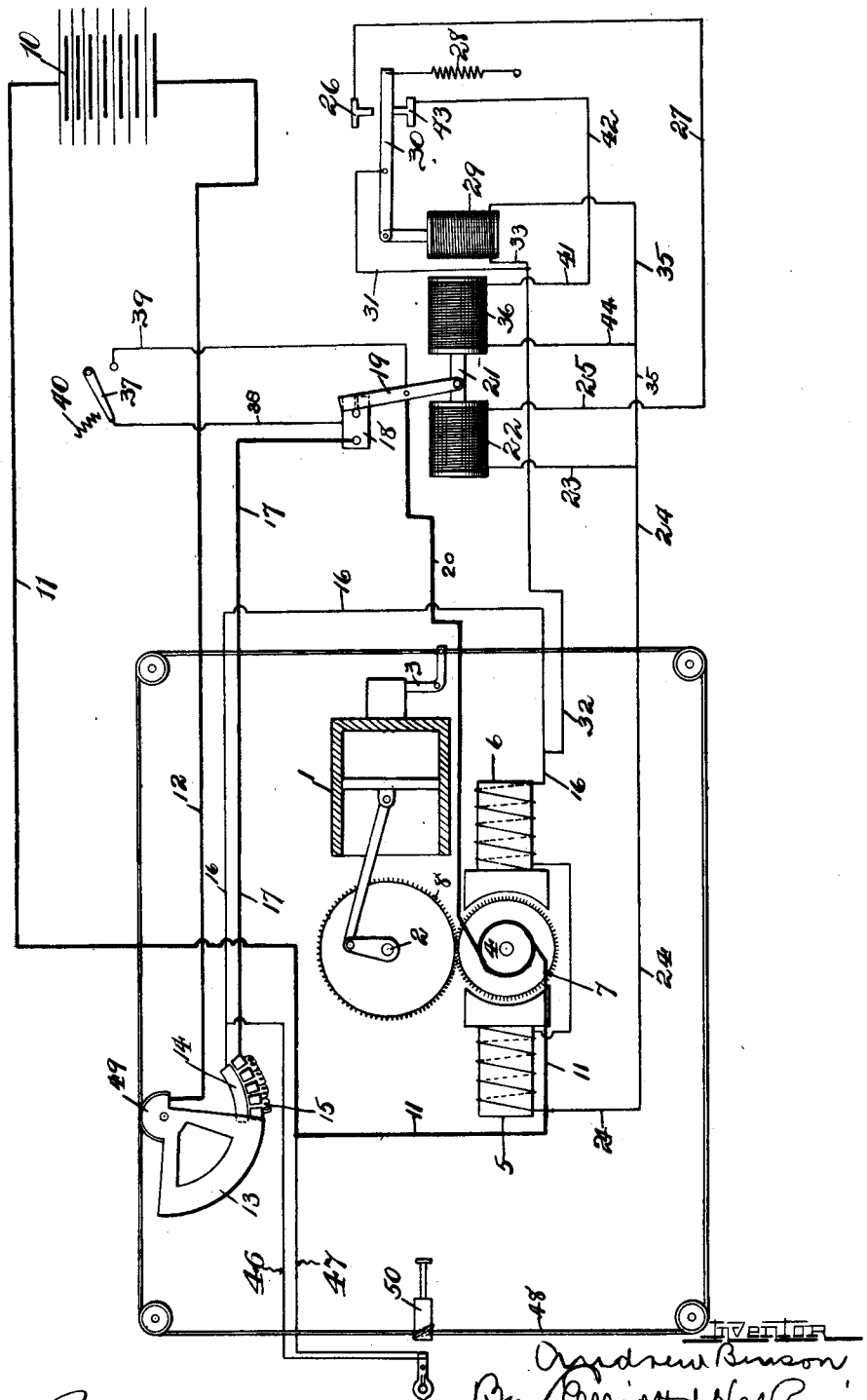
Witnesses
JBKeir
Ira D. Perry
Inventor
Andrew Benson
By Elliott & Hopkins
Atty

UNITED STATES PATENT OFFICE.

ANDREW BENSON, OF CHICAGO, ILLINOIS, ASSIGNOR OF ONE-HALF TO ROBERT P. PRICE AND JOHN P. PRICE, OF SAME PLACE.

MOTOR.

SPECIFICATION forming part of Letters Patent No. 675,847, dated June 4, 1901.

Original application filed November 4, 1899, Serial No. 735,747. Divided and this application filed December 26, 1899. Serial No. 741,559. (No model.)

*To all whom it may concern:*

Be it known that I, ANDREW BENSON, a citizen of the United States, residing at No. 53 River street, in the city of Chicago, county of Cook, and State of Illinois, have invented certain new and useful Improvements in Electric Generators or Motors, of which the following is a full, clear, and exact specification.

My invention relates to electric motors or shunt-wound generators adapted for use interchangeably as motors and dynamos; and it has for its primary object to provide improved means whereby the apparatus when working as a dynamo will automatically cut itself out of the storage-battery circuit when the battery becomes fully charged, leaving the system intact for running the apparatus as a motor with such charge.

With these ends in view my invention consists in certain features of novelty in the construction, combination, and arrangement of parts by which the said objects and certain other objects hereinafter appearing are attained, all as fully described with reference to the accompanying drawing, and more particularly pointed out in the claims.

The said drawing is a diagrammatic illustration of an electric and mechanical motor and the various circuits and controlling devices embodying my invention.

As an example of the many uses to which my invention may be put I have shown the electric motor or shunt-wound generator as a means of starting an explosion-engine when the storage battery is charged or as a means of charging such battery by power derived from such engine.

1 represents the cylinder of the explosion or gasolene engine, 2 the crank-shaft, and 3 a lever which controls or regulates the opening of the fuel-gas-inlet valve or valves thereof, and 4 is the armature of the electric motor, of which 5 6 are the field-magnets and upon the shaft of which armature is secured a pinion 7, which meshes with a gear-wheel 8 on the crank-shaft 2, thereby making the armature subserve as a fly-wheel for the gas-engine, or, otherwise stated, the fly-wheel of the gas-engine serves as an armature-core for the electric motor.

10 is a storage battery whose negative pole is connected by conductor 11 with the positive pole of the motor or dynamo, which is of the shunt-wound type, while the positive pole of the battery 10 is connected by conductor 12 with a controller or switch 13, which is adapted to overlap a plain contact 14 and also over any number of a series of resistance-contacts 15 of the usual or any suitable rheostat. The plain contact 14 is elongated, so that the controller 13 will first contact with it and will remain in contact therewith as long as in contact with any of the contacts 15, and such contact 14 is connected by conductor 16 to the helix of field-core 6, while the series of contacts 15 is connected by conductor 17 with an insulated contact 18, with which is adapted to contact a circuit-closer 19, connected by conductor 20 with the negative pole of the motor or dynamo, so that when the circuit-closer 19 is in contact with the contact 18 and the controller 13 in contact with the end of the plate 14, which extends beyond the range of contacts 15, the full current of the battery will pass along 12, 13, and 16 direct to the field-coils 6, and thence to field-coils 5, thus energizing the field-cores 5 6 before the controller 13 engages the first one of the contacts 15, and consequently before the armature-core 4 is energized. Hence it is evident that by a gradual and proper manipulation of the controller 13 the battery-current may be sent into the field-coils and rotation of the armature thereby induced before any current enters the armature-coils, a condition that is necessary for the operation of a shunt-wound motor, it being understood that should the armature-cores and field-cores be energized simultaneously by the same strength of current the armature will not revolve. Afterward, however, the further movement of the controller 13 admits the current to the armature-coils with greater or less strength, as required, through 13, 15, 17, 18, 19, and 20 and it passes from the armature-coils via 11 back to the battery 10, together with that portion of the current which enters the fields. This results in rotating the armature 4 and imparting movement to the engine-piston through the intermediary of the connections already described, thus starting the gas-engine, which will in turn react on the armature-shaft, and as soon as its speed becomes sufficient the motor will become a dynamo and begin to generate a current in the armature-coils and send it to the battery along 20 19 18 17 15 13 12 (the circuit being completed by conductor 11) in the reverse direction of that already described with reference to the direction of current when used for actuating the electric motor. The current will continue to flow to the battery as long as the engine operates and until the battery becomes fully charged, whereupon the circuit to the battery is automatically broken at 18 19 by the circuit-closer 19 moving to the right. This movement of the circuit-closer 19 is accomplished by connecting the latter, which is shown in the drawing in the form of a pivoted bar or lever, to the core 21 of a solenoid or magnet 22, whose terminal 23 is connected to the battery 10 by conductor 24, while its terminal 25 is connected to an insulated contact 26 by conductor 27, so that when the current passes through the solenoid 22 the circuit at 18 19 will be broken. This cannot occur, however, until the current becomes strong enough to overcome (through the agency of a magnet or solenoid 29) a spring or resistance 28, acting to restrain a circuit-closer 30 from contacting with the contact 26, the circuit-closer 30 being connected by conductor 31 to conductor 32, which is in turn connected to conductor 16, and the terminal 33 of the helix 29 being also connected to conductor 32, while its terminal 34 is connected by conductor 35 to the conductor 24. By the described means it will be seen that so long as the controller 13 is in contact with plate 14 the solenoid 29 is subjected to the full battery strength through 16 and 32, the current returning to battery via 35 and 11, and consequently the solenoid 29 will be ever ready to close 26 30 and effect the opening of switch or cut-out 19 whenever the battery charge reaches the maximum, and thereby cut the battery out of circuit with the armature-coils; but as soon as the charge is reduced below a certain tension a magnet or solenoid 36, into which one end of the core or armature 21 projects, will throw the circuit-closer or cut-out 19 back into engagement with the contact 18 and again place the battery in circuit with the armature-coils. This will be accomplished automatically by any reduction in the battery charge from whatever cause, such as the connection of controller 13 with plate 14, the use of the charge for illuminating purposes or igniting the gas in the gas-engine; but for the sake of convenience and certainty there may be employed a hand-operated circuit-closer 37, connected by conductors 38 39 to contact 18 and circuit-closer 19, respectively, so that by closing the switch or circuit-closer 37 the battery-voltage may soon be reduced sufficiently to actuate the solenoid or magnet 36 and shift the circuit-closer 19 into engagement with its companion contact 18, the switch 37 being held normally open, if desired, by a spring 40 or other means, so that when the apparatus is used on a vehicle the possibility of the switch 37 being allowed to remain closed and the charge drained away will be avoided. This operation of the solenoid or magnet 36 is effected in the following manner: One terminal 41 of the solenoid 36 is connected by conductor 42 to a contact 43, with which the circuit-closer 30 is held normally in contact by a spring 28, while the other terminal 44 of solenoid 36 is connected to conductor 35. Hence as soon as resistance of the spring 28 exceeds the strength of the solenoid 29 the circuit will be closed through solenoid 36 via 41, 42, 43, 30, 31, 32, 16, 14, 13, and 12 on one side and 44, 35, 24, and 11 on the other side and the electrical machine will be in readiness to be used as either a motor or a dynamo, as the exigencies of the case may require.

45 represents an electric lamp connected by conductors 46 47 to the conductors 11 16, respectively, which may be utilized as a headlight or for any other desired purpose when the invention is employed as motive power for a vehicle.

The controller 13 is actuated from the operator's post by a cord 48 or other suitable connection, which is also connected to the lever 3, which controls the supply-valve of the engine, the cord 48 being attached at each end to the lever 3 and wound around a drum 49 on the controller 13 and also around a hand-operated drum 50, arranged at a convenient point, so that by turning the drum 50 the motor will be thrown into circuit and the supply-valve of the engine simultaneously opened, or vice versa, thus making it impossible to start the electric motor without giving the engine its proper supply of fuel or gas.

It will be understood that the use of reference numerals or characters in the claims is resorted to for the sake of clearness and not for the purpose of specifying the particular construction of the elements referred to thereby.

This application is a division of my application, Serial No. 735,747, filed November 4, 1899, which forms the subject-matter of the controller for simultaneously controlling the engine and electric motor.

Having thus described my invention, what I claim as new therein, and desire to secure by Letters Patent, is—

1. The combination of an electric generator, a storage battery, a main circuit including said generator and battery, means for opening and closing said circuit at will, a potential-switch actuated by two magnets or solenoids included respectively in normally open and closed circuits in parallel to the said battery and generator, and a magnet or solenoid controlling said normally open circuit included in a permanently-closed parallel circuit, whereby the battery-circuit is closed when the potential of the battery is less than that of the generator and broken when it rises above that point, substantially as set forth.

2. The combination of a shunt-wound motor, a storage battery in circuit with said motor, means for opening and closing said circuit at will, a cut-out for opening said circuit automatically, an electrically-actuated device for operating said cut-out, a normally open circuit including said device and connected with said battery and a normally closed circuit connected with the battery and means actuated by said normally closed circuit for closing said normally open circuit when the battery charge reaches the maximum, substantially as set forth.

3. The combination of a shunt-wound motor, a storage battery having one pole connected with one terminal of the field and one terminal of the armature of said motor, a contact-plate connected with the other terminal of the motor-field, an automatic cut-out having one of its members connected with the other terminal of said armature and its other member connected with a series of resistances, a controller connected with the other pole of the battery and adapted to connect with said contact-plate and resistances and a circuit including said electrically-actuated devices having its terminals connected with said contact-plate and one pole of the battery respectively, substantially as set forth.

4. The combination of an electric generator, a storage battery, a main circuit including said generator and battery and having a switch 19 means for opening said circuit at will, an electrically-actuated device 36 for closing said switch 19, a second circuit 41 44 normally in communication with said battery and including said device 36, an automatic circuit-breaker 29 30 for breaking said second circuit when the battery reaches a maximum charge and means for opening said switch 19 as said second circuit opens, substantially as set forth.

5. The combination with an electric generator, a storage battery, a main circuit including said generator and battery and having a switch 19, an electrically-actuated device 36 for closing said switch 19, a second circuit 41 44 normally in communication with the battery and including said device 36, means for opening said main circuit at will, an automatic circuit-breaker 29 30 for breaking said second circuit when the battery charge reaches a maximum, a third circuit normally open when the battery charge is low or normal and closing simultaneously with the opening of said second circuit, and an electric device 22 included in said third circuit for opening said switch 19, substantially as set forth.

6. The combination of an electric generator, a storage battery, a main circuit, a switch 19 in said circuit, electrically-actuated apparatus connected with the battery and having operative connection with said switch for holding the switch closed when the charge of the battery is normal and holding it open when the battery charge is at its maximum and a second switch for closing said main circuit at will independently of said switch 19 substantially as set forth.

7. The combination of an electric generator, a storage battery, a main circuit having a switch 19, including said battery and generator, a shunt-circuit connected with the main circuit and having means therein for holding said switch closed when the charge of the battery is normal or low, a second shunt-circuit normally open and including means for opening said switch, a third shunt-circuit having communication with the battery, a switch for alternately closing said first and second shunt-circuits, a spring or resistance connected with said switch 30 for holding the first shunt-circuit closed during a normal charge of the battery and means included in said third shunt-circuit for overcoming said spring and closing said second shunt-circuit when the battery charge becomes abnormal, substantially as set forth.

ANDREW BENSON.

Witnesses:
F. A. HOPKINS,
IRA D. PERRY.